June 10, 1969 S. KURLANDSKY 3,448,954
CHAIN FOR SUPPORTING FLEXIBLE CONDUIT
Filed Aug. 30, 1967

INVENTOR
Sam Kurlandsky

BY Hueschen & Kurlandsky

ATTORNEYS

INVENTOR
Sam Kurlandsky
ATTORNEYS

INVENTOR
Sam Kurlandsky

INVENTOR
Sam Kurlandsky

United States Patent Office 3,448,954
Patented June 10, 1969

3,448,954
CHAIN FOR SUPPORTING FLEXIBLE CONDUIT
Sam Kurlandsky, Kalamazoo, Mich., assignor to Aero-Motive Mfg. Co., Kalamazoo, Mich., a corporation of Michigan
Filed Aug. 30, 1967, Ser. No. 664,540
Int. Cl. F16l *3/14;* F16g *13/07*
U.S. Cl. 248—51                                                19 Claims

ABSTRACT OF THE DISCLOSURE

A chain for supporting flexible conduit formed of links pivotally interconnected at their ends, each link formed of at least two plates each having a convexly arcuate end and a concavely arcuate end, the links thereby being adapted for nesting between the concavely arcuate end and convexly arcuate end of adjacent links.

Background of the invention

The present invention relates to chains and is more particularly concerned with a chain designed to support flexible conduits such as electrical cables and fluid conducting hoses which transport electricity and/or fluids to a movable station.

Apparatus has been disclosed in the prior art adapted to support conduits for electrical current, or liquid or gaseous media to stations which are adapted to move, particularly in a straight line, as for example large machine tools and cranes. Such apparatus utilizes one or more chains comprised of a plurality of interconnected links and having supporting means for the conduit.

Pivotal movement between the links is limited in one direction to a point where the links lie in a straight line and in the other position at an acute angle. Consequently, when in one position the chain is self-supporting in a straight line. Moreover, when turned in the other direction, the chain is self-supporting at a curvature having a predetermined radius. The chain is normally mounted with one end attached to a fixed station and the other attached to a station movable along a straight line path. The chain is normally arranged to extend as a horizontal U between the fixed station and the movable station, and in some embodiments is completely self-supporting. In other embodiments a supporting track or bed may be utilized. In most applications two parallel chains held in spaced apart relationship by conduit-supporting members are used.

Prior art chains as described above, although they are generally satisfactory in carrying out their function of supporting cables and conduits, are subject in some cases to the disadvantage that the pivotal ends are exposed and provided a certain amount of danger to the operator. Additionally, the links are subject to being fouled by the entrance of foreign particles therebetween.

Summary of the invention

It is an object of the invention to provide a chain support for flexible conduit which is self-supporting and is not necessarily supported by means of tracks. It is an additional object to provide a chain support of the type described which is relatively simple and inexpensive to build. It is a further object to provide a supporting chain wherein each pair of links is pivotal between two limiting positions. It is a further object to provide a chain support wherein the chain link ends are fully covered, thereby protecting the operator and preventing foreign particles from entering and causing the chain to fail. The accomplishment of the foregoing and additional objects will become more fully apparent hereinafter.

According to the invention, a chain support for flexible conduit is provided comprised of a plurality of interconnected links, each adjacent pair of links being adapted to pivot at their ends between two limiting positions. In a preferred embodiment, the limits are so designed that the chain is horizontal in one limiting position, and curved about a predetermined radius of curvature at the other limit. Each link is comprised of at least two plates, each plate having both a convexly arcuate end and a concavely arcuate end. The plates are affixed together, as by means of bolts or rivets with their concavely arcuate ends overlapping and with their convexly arcuate ends oriented in opposite directions. Pivot means are provided at each convexly arcuate end. Alternatively each link may set plates of contour as described above, and may be provided in the form of an integral structure having offset plates of contour as deschibed above, and may be formed by such processes as molding or die-casting. Adjacent links are connected together by means such as pivot pins with each convexly arcuate end nested in the concavely arcuate end of the plate of an adjacent link. As a result of the structure described, the joint between each pair of adjacent links is completely shielded so that they cannot cause harm to the operator who might come in contact with the chain when the link joints are being pivoted, and is so constructed that no foreign particles can enter between the links.

Brief description of the drawings

The invention in its preferred embodiment is illustrated by the accompanying drawings in which:

Reference is now made to the accompanying drawings for a better understanding of the invention, wherein all the parts are numbered and wherein the same numbers are used to refer to the same parts throughout.

Referring to FIG. 1, a chain support according to the invention is shown together with supported conduits, and comprises lateral chains 1 and 2 each comprised of a plurality of pivotally interconnected links 3 and 4, respectively. The lateral chains 1 and 2 are connected together at intervals by transverse supporting members 5 and 6. A plurality of conduits 7, 8, and 9 are supported between the supporting members 5 and 6. Alternatively, as shown in FIG. 2, single supporting members 11 may be utilized having openings 12 and 13 provided therein through which the conduits extend. The supporting members, whether those of FIG. 1 shown by the numerals 5 and 6 or those of FIG. 2, may be affixed either at each link of the chain or may be spaced one or more links apart.

FIGS. 3 and 4 illustrate basic plates which may be utilized to form links of one form of embodiment of the present invention. FIG. 3 illustrates an outer plate and comprises a sheet-form body 14 having a convex end 15 and a concave end 16. Additionally the plate has mounting holes 17 and 18, a pivot pin hole 19, and a limit pin hole 20. The inner plate shown in FIG. 4 comprises a sheet-form body 22 having a convex end 23 and a concave end 24. The plate of FIG. 4 is preferably identical in size and shape to that of FIG. 3. The inner plate of FIG. 4 additionally has mounting holes 25 and 26, a pivot pin hole 27 and an arcuate slot 28.

FIG. 5 illustrates a two-plate link prepared by affixing the plate of FIG. 3 to the plate of FIG. 4 by means of bolts 30 and nuts 31. Alternatively rivets or other suitable means may be utilized. The bolts are inserted through the holes 17 and 18, and 25 and 26, respectively. The plates are so arranged and shaped that the convex end 23 of the plate 22 and the concave end 16 of the plate 14 are contiguous with the surface of a common imaginary cylinder whose axis passes through the center of the pivot pin hole 27. Moreover, the convex end 15 of the plate 14 and the concave end 24 of the plate 22 are contiguous with the surface of an imaginary cylinder whose axis passes through the center of the pivot pin hole 19. With the arrangements as described, all the inner links form a row of plates pointed in one direction in which the convex end of one plate is nested in the concave end of the adjacent plate, thereby shielding the moving edges. In similar manner, the inner links form a row of plates pointed in the other direction wherein the same type of nesting is obtained. As a result, all the moving edges are shielded to prevent personal injuries or entrapment of foreign particles which might damage the links.

FIG. 6 illustrates a chain link formed of two superposed outer plates 14, shown in FIG. 3, bolted together with one inner plate 22, shown in FIG. 4, with the inner plate oriented in opposite direction to that of the outer plates. As shown, the concave ends 16 of the outer plates 14 and convex end 23 of the inner plate 22 are contiguous with the surface of a cylinder whose axis passes through the center of the pivot hole 27. Similarly, the convex ends 15 of the outer plates 14 and the concave end 24 of the inner plate 22 are contiguous with the surface of a cylinder whose axis passes through the center of the pivot holes 19. As a result of this arrangement, when a chain is assembled of the links shown in FIG. 6, the convex ends of each plate in a row nest in concave end cavities of adjacent plates and thus form a completely enclosed chain.

FIG. 7 illustrates in edge view a chain prepared from two links as shown in FIG. 5. In addition to the two links, the chain comprises a limit pin 32 and a pivot pin 34 which are held in place by washers 35. A chain formed as in FIG. 7 is completely shielded at its edges and on one side, but has arcuate slots 28 which may be partially exposed.

FIGS. 8 and 9 illustrate a chain formed of three-plate links as shown in FIG. 6, and assembled by means of limit pins 32 and pivot pins 34. The bolts and nuts 30 and 31, as shown in FIG. 9, may be utilized to affix cable supporting members 5 and 6, as shown in FIG. 9. The operation of the chain is best illustrated in FIG. 9. Referring to the joint between the adjacent links which are in the limiting position in which they are aligned in a straight line, the limit pin 32 engages the lower limiting end of the slot 28, thereby establishing the limiting position. The convexly arcuate end 15 of the plate is nested in and completely covered by the concavely arcuate end 16 of the adjacent plate. Consequently, there is no place where the fingers or hands of an operator could be snagged or pinched. Similarly, considering the two adjacent links which are in the limiting position in which they are disposed at an angle to each other, the limit pin 32 is now at the upper end of the slot 28, thereby establishing the upper limiting position. As can be seen, even when the links are disposed at an angle, the convexly arcuate edge 15 is still completely covered by the concavely arcuate end 16 of the adjacent link. Thus the ends of each link are completely covered at any pivotal position, protecting the operator and preventing foreign particles from entering the joint and impairing the operation of the chain.

FIGS. 10–13 illustrate another embodiment of the invention similar to that of FIGS. 3–9, but where the means for limiting pivotal movement comprises a combination of a limiting tab and a complementary peripheral recess instead of a limiting pin and complementary arcuate slot.

FIGS. 10 and 11 illustrate basic plates which may be utilized to form links. FIG. 10 illustrates an inner plate comprising a sheet-form body 40 having a convexly arcuate end 41, and a concavely arcuate end 42, mounting holes 43 and 44, and a pivot pin hole 45. Additionally the plate has a limit tab 46 positioned at the concave end 42 and a complementary peripheral arcaute notch 47 positioned at the convex end 41 and adapted to engage the limit tab 46 of an adjacent link.

FIG. 11 illustrates a plate similar in form to that of FIG. 10 but having no limit tabs or arcuate notches, and designed to serve as an outer plate to shield the tabs and notches of innerlying plates. The plate comprises a sheet-form body 48 having a convexly arcuate end 49 and a concavely arcuate end 50, mounting holes 51 and 52, and a pivot pin hole 53. The outer plate may be utilized in conjunction with the inner plate shown in FIG. 3 and serves to shield the chain from the entrance of foreign particles into the peripheral slots.

FIG. 12 illustrates a chain link formed of two plates 48, as shown in FIG. 11, bolted together with one inner plate 40, as shown in FIG. 10. In this structure the outermost plates 48 are superposed and the inner plate 40 is disposed intermediate the two outermost plates and directed in opposite direction. The concave end of the innermost plate is overlapped by and affixed to the concave ends of the outermost plates by means of bolts 54 and nuts 55. In the structure as shown, at one end of the link the convex surface 41 of the intermediate plate and the concave surfaces 50 of the outermost plates are substantially contiguous with the surface of an imaginary cylinder whose axis passes through the center of the pivot hole 45. In similar manner, the convex ends 49 of the outermost plates and the concave end 42 of the intermediate plate are substantially contiguous with the surface of a cylinder whose axis passes through the center of the pivot holes 53. As a result of this structure, when the links are formed into a chain, as shown in FIG. 13, the convex ends of each plate in a row nest with the concave ends of adjacent plates and thus form a chain which is completely enclosed and shielded on the outside.

FIG. 13 illustrates a chain support segment formed of two chains, one on each side, formed of links such as illustrated in FIG. 12, by inserting pivot pins 56 through the pivot pin holes 45 and 53 and securing the pivot pins by retaining washers 57. Additionally, transverse supporting members 5 and 6 are affixed to the upper and lower edges, respectively, of each chain by means of the bolts 54 and nuts 55. The function of the tabs and peripheral slots in providing two limiting positions of pivotal movement can be seen in FIG. 13. Considering the joint between the links which are aligned in a straight line, the tab 46 engages the lower limiting surface of the slot 47 and prevents any further pivotal movement in one direction. At the joint between the links which are disposed at an angle to each other less than 180°, the tab 46 engages the upper limiting surface of the notch 47 preventing the link at the extreme left from pivoting further in an upward direction. Further, as can be seen, whether adjacent links are aligned in a straight line or at an angle, in each case the convex end 49 is completely covered by the concave end 50, thereby shielding the moving parts at each joint and making it impossible for the operator's hand or clothing to be caught in the links while they pivot, and additionally preventing the entrance of foreign particles.

FIGS. 14–17 illustrate still another embodiment of the invention. In this embodiment similar plates having both convex and concave ends are affixed together in the same manner as in the embodiments described above. However, in this embodiment raised sectors defining radially aligned limiting surfaces are utilized to provide limiting positions of pivotal movement. FIG. 14 illustrates one of the plates utilized in forming a link and comprises a sheet form body 60 having a convex end 61, a concave end 62, mounting holes 63 and 64, and a pivot pin hole 65. The plate additionally has a sector 66 defining two limiting surfaces 67 and 68 affixed to the plate by means such as welding, molding, die-casting, or other suitable means. Alternatively an integral plate may be utilized which is milled to provide the sector.

FIG. 15 illustrates a complementary plate having substantially the same outline as the plate of FIG. 14, and comprised of a body having a convex end 71, mounting holes 73 and 74, and a pivot pin hole 75. A sector cavity 76 is provided extending partially below the surface of the plate. The sector cavity defines limiting surfaces 77 and 78 and is adapted to have the sector 66 of an adjacent plate disposed therein.

FIG. 16 illustrates a link formed by bolting together the plate of FIG. 14 with the plate of FIG. 15 by means of bolts 79 and nuts 80. As in the case of the links described above, the convex end 71 of the plate 70 and the concave end 62 of the plate 60 are substantially contiguous with the surface of an imaginary cylinder whose axis passes through the center of the pivot hole 75, while the convex end 61 of the plate 60 and the concave end 72 of the plate 70 are substantially contiguous with the surface of a common imaginary cylinder whose axis passes through the center of pivot pin hole 65.

FIG. 17 illustrates a chain segment formed by connecting together a plurality of links according to FIG. 16 by means of pivot pins 81 held in place by means of retaining washers 82. As can be seen, at the joint between two adjacent links oriented in the limiting position in which they are oriented in a straight line, the limiting surface 68 engages the limiting surface 77. Further, when the adjacent links are in the limiting position in which they are at an angle to each other less than 180°, the limiting surface 67 engages the limiting surface 78. Thus two limiting positions are provided. Additionally, the convex end 61 is nested in and engaged by the concave end 62 of an adjacent link. Moreover, the convex ends 71 are nested in and engaged by the concave ends 72. As a result, a completely shielded chain is provided wherein each pair of adjacent links have two limiting positions of pivotal movement.

Figure 1:
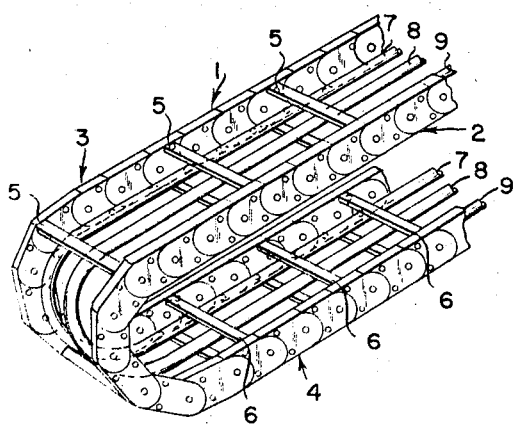
FIG. 1 is a perspective view of a chain assembly and supported conduits.
Figure 2:
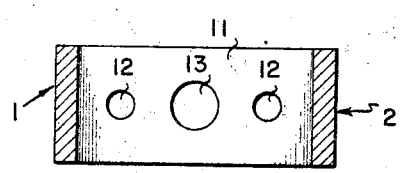
FIG. 2 is a cross-sectional view through a chain assembly having a somewhat modified transverse supporting member.
Figure 3:
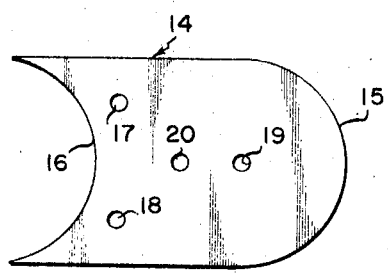
FIG. 3 is a plan view of an outer plate for forming a chain according to the invention.
Figure 4:
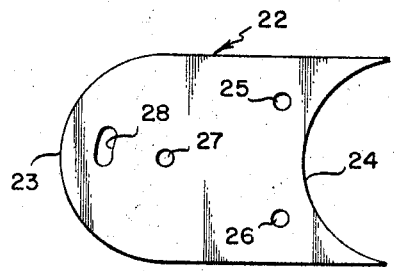
FIG. 4 is a plan view of an inner plate used in conjunction with the outer plate of FIG. 3 to form a link.
Figure 5:
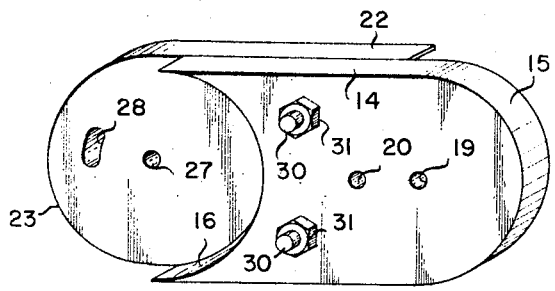
FIG. 5 is a perspective view of a two-plate link.
Figure 6:
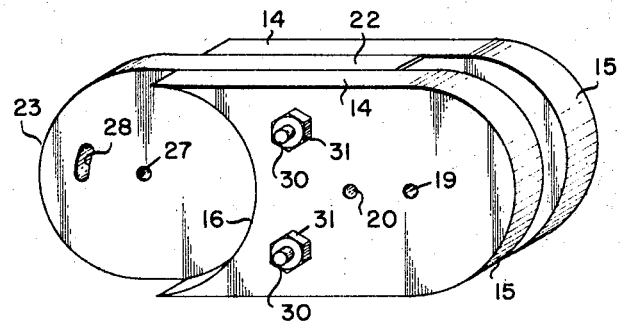
FIG. 6 is a perspective view of a three-plate link.
Figure 7:
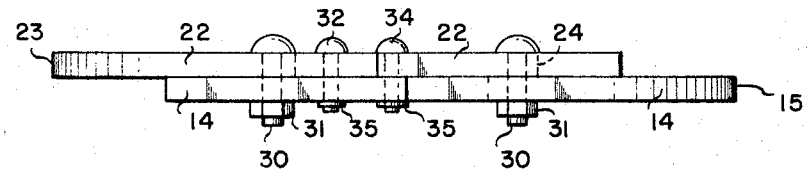
FIG. 7 is an edge view of two two-plate links linked together.
Figure 8:
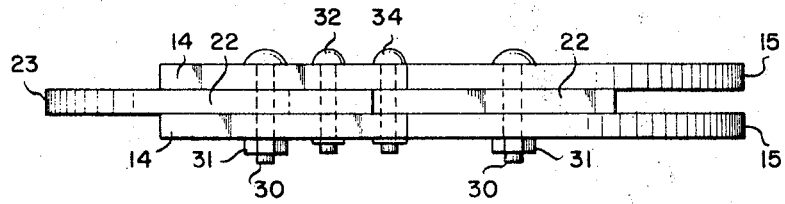
FIG. 8 is an edge view of two three-plate links connected together.
Figure 9:
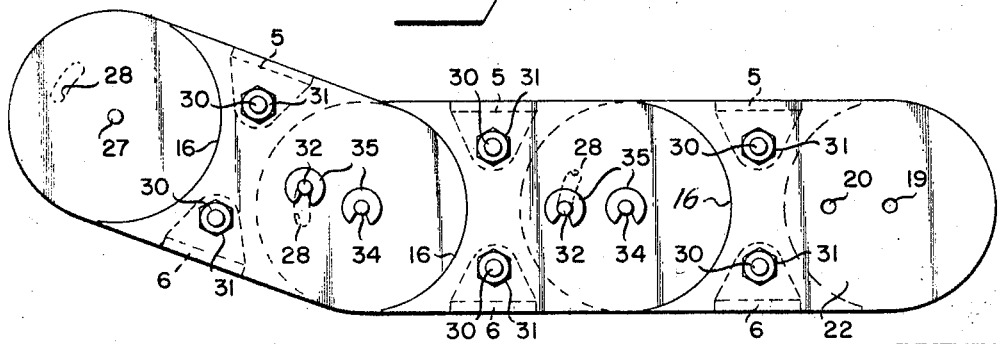
FIG. 9 is an elevational view of a chain support segment formed of links according to FIGS. 6 and 8.
Figure 10:
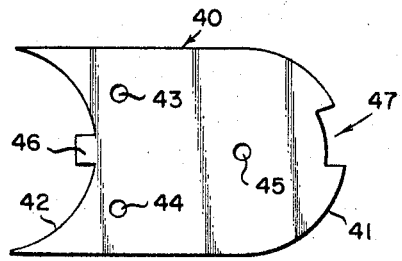
FIG. 10 is a plan view of an inner plate used in forming a chain link according to another embodiment of the invention.
Figure 11:
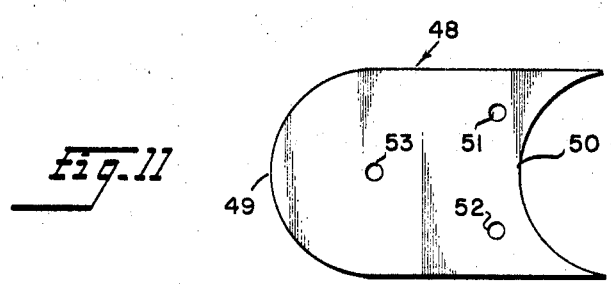
FIG. 11 is a plan view of an outer plate adapted to be used with the plate of FIG. 10.
Figure 12:
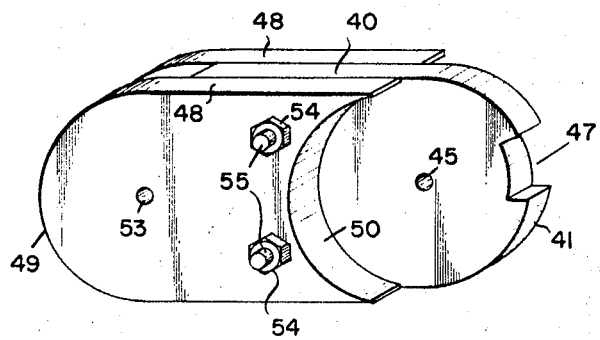
FIG. 12 is a perspective view of a link formed by bolting together two outer plates according to FIG. 11 and an inner plate according to FIG. 10.
Figure 13:
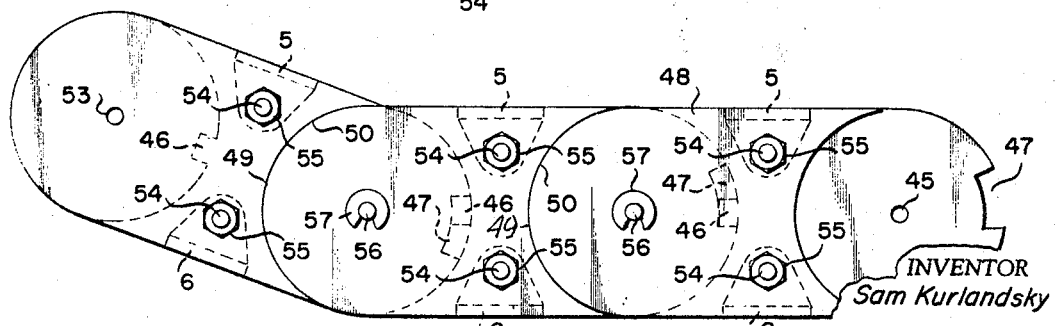
FIG. 13 is an elevational view of a chain support segment formed by connecting together a plurality of links according to claim 12.
Figure 14:
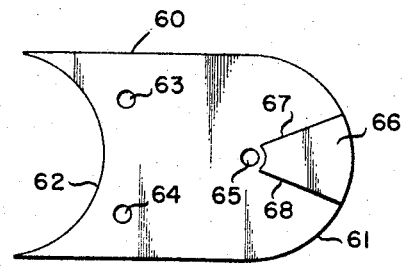
FIG. 14 is a plan view of a plate used in forming a link according to a further embodiment of the invention.
Figure 15:
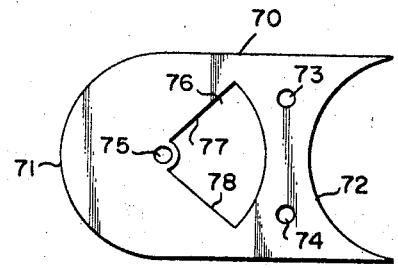
FIG. 15 is a plan view of a link complementary to that of FIG. 14.
Figure 16:
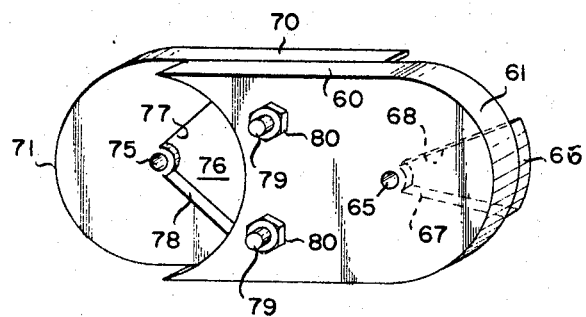
FIG. 16 is a perspective view of a link formed by affixing together a plate according to FIG. 14 with a plate according to FIG. 15.
Figure 17:
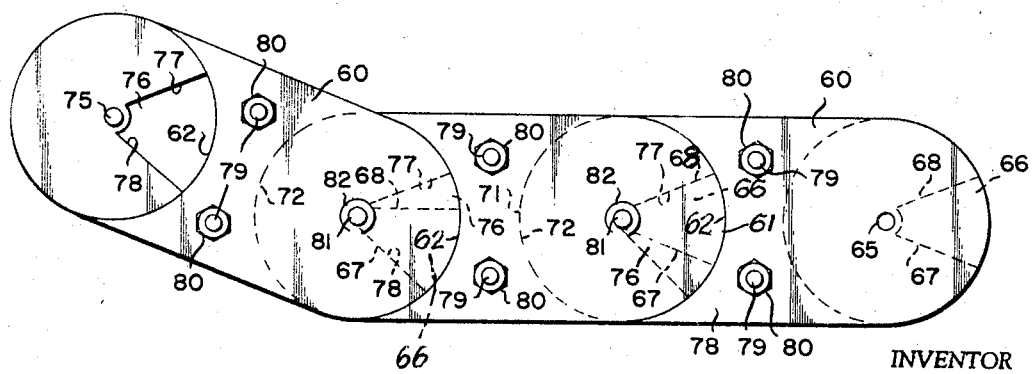
FIG. 17 is an elevational view of a chain support formed by connecting together a plurality of links according to FIG. 16.

The supporting chain structure of the present invention has a number of advantages over prior art structures. First, the chain links may be easily fabricated from plate stock by cutting or stamping a plurality of plates of the same shape and size each having a convex end and a concave end. After the plates have been so cut to form complementary plates, they may be affixed to each other to form either two-plate or three-plate links by means of bolts or rivets. Alternatively, integral links may be molded or die-cast having the same form which is obtained by bolting two plates together. Various forms of pivotal movement limiting means may be provided to form chains wherein the pivotal movement between two links is limited between two predetermined limits. As a primary advantage, the plates are provided with circularly arcuate ends, convex at one end and concave at the other, so that the ends of adjacent plates nest in one another, thereby shielding the moving parts. Thus shielding of the ends may be provided whether two plate links are used or three plate links are used, since in any row of plates the ends are all nested within each other. The chains of the present invention are relatively inexpensive to produce and may be produced with relatively simple machinery. The links are readily fabricated by simply cutting and drilling the flat plates, and may be readily dismantled for repair or link replacement.

Although in the embodiments described and shown in the drawings each link is comprised of only two or three plates, it is of course to be understood that 4, 5, 6, or even more plates may be utilized for certain purposes and are to be considered as falling within the invention disclosed and claimed. For example, additional plates may be utilized to give greater strength to each link. Additional plates having limit means may be utilized to provide greater strength at the limiting positions. Alternatively, very thin plates may be utilized at the outside of the link to serve as a cover or shield for the slots, notches, etc., which comprise the limit means. Additionally, instead of complete plates, partial plates maye be utilized to cover the slots, notches, etc., which remain exposed, as for example, when only two plates are utilized in a link.

It is to be understood that the invention is not limited to the exact details of construction, operation or exact materials or embodiments shown and described, as obvious modifications and equivalents will be apparent to one skilled in the art.

I claim:

1. A support for a flexible conduit, said conduit being adapted to be operated with one end connected to a fixed station and the other end connected to a movable station, said support comprising at least one chain having conduit supporting means affixed thereto, said chain comprising a plurality of interconnected links, pivot means defining a pivotal point and connecting together the ends of each pair of adjacent links to provide pivotal movement with respect to each other, each of said links comprising at least two plates, each plate comprising a convexly arcuate end and a concavely arcuate end adapted to mate with the concavely arcuate end and convexly arcute end, respectively, of adjacent links, the plates of each link being positioned in oppositely oriented direction with the concavely arcuate end of one plate overlapping and affixed to the concavely arcuate end of the other plate, at each end of said link the convexly arcuate end of one plate and the concavely arcuate end of the other plate being substantially contiguous with the surface of a common imaginary cylinder having its axis through the pivotal point of said link.

2. A support for a flexible conduit, said conduit being adapted to be operated with one end connected to a fixed station and the other end connected to a movable station, said support comprising a pair of chains having conduit supporting means intermediate end affixed to said chains and maintaining said chains in parallel spaced apart relationship, each of said chains comprising a plurality of interconnected links, each pair of interconnected links having their ends connected to form a pivotal point and arranged for pivotal movement with respect to each other about a common pivotal point, and limit means at each pivotal point providing two limiting positions of said pivotal movement, each of said links comprising at least two plates, each plate comprising a convexly arcuate end and a concavely arcuate end adapted to mate with the concavely arcuate end and convexly arcuate end, respectively, of adjacent links, the plates of each link being positioned in oppositely oriented direction with the concavely arcuate end of one plate overlapping and affixed to the concavely arcuate end of the other plate, at each end of said link the convexly arcuate end of one plate and the concavely arcuate end of the other plate being substantially contiguous with the surface of a common imaginary cylinder having its axis passing through said pivotal point.

3. A support according to claim 2, wherein at each pivotal joint said limit means comprises an arcuate slot provided in a plate of one link and a limit pin provided in a plate of the other link and disposed in said arcuate slot, at each limiting position said limit pin engaging one end of said slot.

4. A support according to claim 2, wherein at each pivotal joint said limit means comprises a limit tab having limiting surfaces on both sides thereof provided at the periphery of the end of a plate of one of said links and a peripheral notch having spaced apart limiting surfaces provided at the periphery of the end of the other of said links, the tab of one link being disposed within the peripheral slot of the adjacent link, at each limiting position of pivotal movement one limiting surface of said tab engaging a limiting surface of said notch.

5. A support according to claim 2, wherein at each pivotal joint said limit means comprises a pair of complementary sectors each having a pair of angularly spaced apart limiting surfaces, one of said sectors mounted on each link of a pair of adjacent interconnected links, at each limiting position a limiting surface of the sector of one link engaging a limiting surface of the sector of the other link.

6. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced apart relationship, each of said chains comprising a plurality of interconnected links, each pair of interconnected links having their ends connected to form a pivotal joint and arranged for pivotal movement with respect to each other about a common pivotal point, and limit means at each pivotal joint providing two limiting positions of said pivotal movement, each of said links comprising three plates, each plate comprising a convexly arcuate end and a concavely arcuate end adapted to mate with the concavely arcuate and convexly arcuate ends, respectively, of adjacent links, two of said plates being superposed and oriented in one direction and a third plate being oppositely oriented to said two plates, and means affixing said plates together, the convexly arcuate ends of said first two plates and the concavely arcuate end of said third plate being substantially contiguous with the surface of a common imaginary cylinder whose axis passes through the pivotal point at the end of said link, and the concave ends of said two plates and the convex end of said third plate being substantially contiguous with the surface of a common imaginary cylinder whose axis passes through the pivotal point at the other end of said link.

7. A support according to claim 6, wherein said two superposed plates are in spaced apart orientation and the concavely arcuate ends of said superposed plates overlap and includes therebetween the concavely arcuate end of said third plate, the convexly arcuate end of said third plate being positioned intermediate the convexly arcuate ends of the superposed plates of an adjacent link.

8. A support according to claim 7, wherein at each pivotal joint said limit means comprises an arcuate slot provided in a plate of one link and a limit pin provided in a plate of the other link and disposed in said arcuate slot, at each limiting position said limit pin engaging one end of said slot.

9. A support according to claim 7, wherein at each pivotal joint said limit means comprises a limit tab having limiting surfaces on both sides thereof provided at the periphery of the end of a plate of one of said links and a peripheral notch having spaced apart limiting surfaces provided at the periphery of the end of the other of said links, the tab of one link being disposed within the peripheral slot of the adjacent link, at each limiting position of pivotal movement one limiting surface of said tab engaging a limiting surface of said notch.

10. A support according to claim 7, wherein at each pivotal joint said limit means comprises a pair of complementary sectors each having a pair of angularly spaced apart limiting surfaces, one of said sectors mounted on each link of a pair of adjacent interconnected links, at each limiting position a limiting surface of the sector of one link engaging a limiting surface of the sector of the other link.

11. A chain comprising a plurality of interconnected links, pivot means defining a pivotal point and connecting together the ends of each pair of adjacent links to provide pivotal movement with respect to each other, each of said links comprising at least two plates, each plate comprising a convexly arcuate end and a concavely arcuate end adapted to mate with the concavely arcuate end and convexly arcuate end, respectively, of adjacent links, the plates of each link being positioned in oppositely oriented direction with the concavely arcuate end of one plate overlapping and affixed to the concavely arcuate end of the other plate being substantially contiguous with the surface of a common imaginary cylinder having its axis through the pivotal point of said link.

12. A chain according to claim 11, wherein at each pivotal joint said limit means comprises an arcuate slot provided in a plate of one link and a limit pin provided in a plate of the other link and disposed in said arcuate slot, at each limiting position said limit pin engagng one end of said slot.

13. A chain according to claim 11, wherein at each pivotal joint said limit means comprises a limit tab having limiting surfaces on both sides thereof provided at the periphery of the end of a plate of one of said links and a peripheral notch having spaced apart limiting surfaces provided at the periphery of the end of the other of said links, the tab of one link being disposed within the peripheral slot of the adjacent link, at each limiting position of pivotal movement one limiting surface of said tab engaging a limiting surface of said notch.

14. A chain according to claim 11, wherein at each pivotal joint said limit means comprises a pair of complementary sectors each having a pair of angularly spaced apart limiting surfaces, one of said sectors mounted on each link of a pair of adjacent interconnected links, at each limiting position a limiting surface of the sector of one link engaging a limiting surface of the sector of the other link.

15. A chain comprising a plurality of interconencted links, each pair of interconnected links having their ends connected to form a pivotal joint and arranged for pivotal movement with respect to each other about a common pivotal point, and limit means at each pivotal joint providing two limiting positions of said pivotal movement, each of said links ocmprising three plates, each plate comprising a convexly arcuate end and a concavely arcuate end adapted to mate with the concavely arcuate and convexly arcuate ends, respectively, of adjacent links, two of said plates being superposed and oriented in one direction and a third plate being oppositely oriented to said two plates, and means affixing said plates together, the convexly arcuate ends of said first two plates and the concavely arcuate end of said third plate being substantially contiguous with the surface of a common imaginary cylinder whose axis passes through the pivotal point at the end of said link, and the concave ends of said two plates and the convex end of said third plate being substantially contiguous with the surface of a common imaginary cylinder whose axis passes through the pivotal point at the other end of said link.

16. A chain according to claim 15, wherein said two superposed plates are in spaced apart orientation and the concavely arcuate ends of said superposed plates overlap and include therebetween the concavely arcuate end of said third plate, the convexly arcuate end of said third plate being positioned intermediate the convexly arcuate ends of the superposed plates of an adjacent link.

17. A chain according to claim 15, wherein at each pivotal joint said limit means comprises an arcuate slot provided in a plate of one link and a limit pin provided in a plate of the other link and disposed in said arcuate slot, at each limiting position said limit pin engaging one end of said slot.

18. A chain according to claim 15, wherein at each pivotal joint said limit means comprises a limit tab having limiting surfaces on both sides thereof provided at the periphery of the end of a plate of one of said links and a peripheral notch having spaced apart limiting surfaces provided at the periphery of the end of the other of said links, the tab of one link being disposed within the peripheral slot of the adjacent link, at each limiting position of pivotal movement one limiting surface of said tab engaging a limiting surface of said notch.

19. A chain according to claim 15, wherein at each pivotal joint said limit means comprises a pair of complementary sectors each having a pair of angularly spaced apart limiting surfaces, one of said sectors mounted on each link of a pair of adjacent interconnected links, at each limiting position a limiting surface of the sector of one link engaging a limiting surface of the sector of the other link.

References Cited

UNITED STATES PATENTS

| | | | |
|---|---|---|---|
| 1,066,874 | 7/1913 | Aldridge | 214—26 |
| 1,962,291 | 6/1934 | Anderson | 59—78 |
| 2,602,345 | 7/1952 | Braumiller | 74—250 |
| 2,905,264 | 9/1959 | Dennis | 74—250 X |
| 2,975,807 | 3/1961 | Waninger | 138—61 |
| 3,284,036 | 11/1966 | Nansel | 248—49 |
| 3,330,105 | 7/1967 | Weber | 59—78.1 |
| 1,126,904 | 2/1915 | Stark | 305—47 |
| 1,358,494 | 11/1920 | Arndt | 305—47 |

FOREIGN PATENTS 1,460,204  10/1966  France.

CHANCELLOR E. HARRIS, *Primary Examiner.*

U.S. Cl. X.R.

59—78.1; 74—250

PO-1050
(5/69)

UNITED STATES PATENT OFFICE
CERTIFICATE OF CORRECTION

Patent No. 3,448,954      Dated June 10, 1969

Inventor(s) Sam Kurlandsky

It is certified that error appears in the above-identified patent and that said Letters Patent are hereby corrected as shown below:

Column 2, line 13, delete "set plates of contour as described above, and may"; Column 8, line 34, after "plate" insert --- , at each end of said link the convexly arcuate end of one plate and the concavely arcuate end of the other plate" ---.

SIGNED AND
SEALED
DEC 23 1969

(SEAL)
Attest:

Edward M. Fletcher, Jr.
Attesting Officer

WILLIAM E. SCHUYLER, JR.
Commissioner of Patents